(12) United States Patent
Schaller et al.

(10) Patent No.: US 9,683,124 B2
(45) Date of Patent: Jun. 20, 2017

(54) MULTIFUNCTIONAL COATING FILMS THAT CAN BE APPLIED IN LIQUID FORM

(71) Applicant: THUERINGISCHES INSTITUT FUER TEXTIL—UND KUNSTSTOFF—FORSCHUNG E.V., Rudolstadt (DE)

(72) Inventors: Jens Schaller, Herressen (DE); Knut Stengel, Blankenhain (DE); Frank Meister, Rudolstadt (DE); Sabine Riede, Uhlstadt-Kirchhasel (DE)

(73) Assignee: THUERINGISCHES INSTITUT FUER TEXTIL-UND KUNSTSTOFF-FORSCHUNG E.V., Rudolstadt (DE)

( * ) Notice: Subject to any disclaimer, the term of this patent is extended or adjusted under 35 U.S.C. 154(b) by 82 days.

(21) Appl. No.: 14/387,045

(22) PCT Filed: Mar. 27, 2013

(86) PCT No.: PCT/EP2013/000930
§ 371 (c)(1),
(2) Date: Sep. 22, 2014

(87) PCT Pub. No.: WO2013/143696
PCT Pub. Date: Oct. 3, 2013

(65) Prior Publication Data
US 2015/0079291 A1     Mar. 19, 2015

(30) Foreign Application Priority Data

Mar. 28, 2012 (DE) .......................... 10 2012 006 171

(51) Int. Cl.
| | | |
|---|---|---|
| *C09D 101/08* | (2006.01) | |
| *B05D 7/10* | (2006.01) | |
| *C09D 105/00* | (2006.01) | |
| *C09D 5/14* | (2006.01) | |
| *C09D 101/02* | (2006.01) | |
| *C09D 101/00* | (2006.01) | |
| *B05D 3/00* | (2006.01) | |
| *B05D 7/24* | (2006.01) | |
| *C09K 17/14* | (2006.01) | |
| *B05D 1/02* | (2006.01) | |
| *C09K 17/00* | (2006.01) | |
| *C09D 101/26* | (2006.01) | |
| *C09D 101/28* | (2006.01) | |
| *C09D 103/08* | (2006.01) | |

(52) U.S. Cl.
CPC ............. *C09D 101/08* (2013.01); *B05D 1/02* (2013.01); *B05D 3/007* (2013.01); *B05D 7/10* (2013.01); *B05D 7/24* (2013.01); *C09D 5/14* (2013.01); *C09D 101/00* (2013.01); *C09D 101/02* (2013.01); *C09D 101/26* (2013.01); *C09D 101/28* (2013.01); *C09D 101/284* (2013.01); *C09D 101/286* (2013.01); *C09D 103/08* (2013.01); *C09D 105/00* (2013.01); *C09K 17/00* (2013.01); *C09K 17/14* (2013.01); *B05D 2202/00* (2013.01); *B05D 2203/20* (2013.01); *B05D 2203/35* (2013.01); *B05D 2401/20* (2013.01)

(58) Field of Classification Search
CPC ...... C09D 5/14; C09D 101/00; C09D 101/02; C09D 101/08; C09D 105/00; C09K 17/00; C09K 17/14; B05D 1/02; B05D 3/007; B05D 7/24; B05D 2202/00; B05D 2203/20; B05D 2203/35; B05D 2401/20
USPC ........................ 442/123; 523/122, 131, 132; 106/124.51, 124.61, 124.81, 136.1, 15.05, 106/181.1, 192.1, 203.2, 215.2, 215.5, 106/217.7; 427/220, 221, 331, 339; 428/624, 438, 439, 533, 535; 527/300, 527/301, 302, 303, 304, 305, 306, 309, 527/310, 311, 312, 313, 314, 315; 47/58.1; 405/270
See application file for complete search history.

(56) References Cited

U.S. PATENT DOCUMENTS 2,329,741 A * 9/1943 Broderick ............... C08B 11/20
536/90
2,988,455 A * 6/1961 Rosenberg ............. C08B 11/02
106/162.8

FOREIGN PATENT DOCUMENTS

| DE | 69523127 T2 | 6/2002 |
| DE | 10308236 A1 | 10/2003 |
| DE | 10 2005 053 587 A1 | 11/2005 |
| DE | 10 2009 049 284 A | 1/2011 |
| EP | 1316563 A1 | 6/2003 |
| EP | 1698224 A1 | 9/2006 |
| GB | 698 948 A * | 10/1953 |
| GB | 698948 A | 10/1953 |
| WO | WO 2008/112419 A2 | 9/2008 |
| WO | WO 2009/153275 A1 * | 12/2009 |

* cited by examiner

*Primary Examiner* — William Phillip Fletcher, III
(74) *Attorney, Agent, or Firm* — ProPat, L.L.C.

(57) ABSTRACT

Multifunctional coating films that can be applied in liquid form are provided for compressing, sealing, covering and preserving surfaces. The films include a composition of polysaccharide materials and/or homo- or heteroglycan water-soluble polysaccharide derivatives, polyol spacers, and crosslinkers with carbonyl or carboxylic function(s). As-applied, the composition is water-soluble and reactive, but after hardening it is capable of absorbing water or swelling, impermeable to water vapour, stable against water and UV and can be biologically degraded in a controlled manner. By reacting polysaccharide materials, polysaccharide derivatives and polyol spacers with cross linkers having carbonyl or carboxylic function(s), mechanically stable flexible films are obtained, which retain their mechanical properties up to a foreign material content of 80%. The films can swell in a controlled manner and can bind up to 75% water relative to their dry weight, corresponding to the degree of crosslinking and the spacer that is used.

22 Claims, No Drawings

MULTIFUNCTIONAL COATING FILMS THAT CAN BE APPLIED IN LIQUID FORM

CROSS-REFERENCE TO RELATED APPLICATIONS

This application is being filed under 35 U.S.C. §371 as a National Stage Application of pending International Application No. PCT/EP2013/000930 filed Mar. 27, 2013, which claims priority to the following parent application: German Patent Application No, 10 2012 006 171.4, filed Mar. 28, 2012. Both international Application No. PCT/EP2013/000930 and German Patent Application No. 10 2012 006 171.4 are hereby incorporated by reference herein in their entirety.

FIELD OF THE INVENTION

The present invention relates to multifunctional films that can be applied in liquid form and are based on homo- and heteroglycan materials for consolidation and waterproofing, for covering and also for preserving surfaces such as, for example, soils, in order to prevent unwanted growth, building claddings and wood structures in the roof region or at sites of elevated formation of condensate water, as may be found, inter alia, in the region of rear-ventilated facades, or in the cosmetics or medical fields for covering body surfaces.

BACKGROUND OF THE INVENTION

Poorly built, moisture-exposed, wood is generally exposed, to slow bacterially caused rotting and also to fungal infestation and is degraded over a relatively long time period. By lowering the moisture content to approximately 12%, and likewise by treatment with biocides, the degradation may be delayed. In the latter case, however, a rather hydrophilic material is obtained, since naturally degraded wood always resorbs a certain amount of water.

Wood which, although it is externally dry, still possesses a certain core moisture and has been sealed with surface coatings which possess only a low water vapor permeability must also be considered critically. For a lasting treatment of such surfaces, the only means that are known for preserving degraded woods are those using biocidal products or coatings which, however, generally do not meet all of the problems of wood protection and environmental protection. Generally, therefore, the efficacy of the known surface coatings is described as too low.

In addition, it is known that in the current prior art, polyolefin, PET, PA and PVC films are preferably used as coating films for consolidation and waterproofing and also covering of surfaces and as a moisture, vapor and heat barrier in construction, agriculture and forestry, but also in horticulture and landscaping. A disadvantage in this case is the high, manual effort in blanketing or covering, in particular in the case of complex surface geometries or particular structures (silo coverings, early-harvesting films, etc.).

As an alternative to this prior art, the German laid-open application DE 10 2009 049 284 describes a film that can foe applied at least in regions by spraying or coating as a functional layer of a building cladding and vapor barrier for wood structures.

There, plastics dispersions based on synthetic polymers, preferably acrylate/methacrylate, or polyurethane, are used. As a usable plastic, cellulose is also mentioned, but any teaching regarding films based on cellulose is lacking in the meaning of film sections that, can be applied at least in regions by spraying or coating, and possible embodiments thereof.

Film formation from the applied dispersion coating is based preferably on physical and mechanical adhesion of the plastics particles during evaporation of the solvent/dispersant. Therefore, the mechanical properties are limited and can only be adjusted within very narrow limits. To achieve the spraying and film properties, in addition, various additives are absolutely necessary, such as, e.g., antifoams and thickeners. A biodegradability is not adjustable. No functional activities are described, for example, against microorganisms and against feeding pests.

Patent DE 695 23 127 T2 introduces the invention of a crosslinkable cellulose additive for use in latex coating materials. Components of the additive are cellulose ethers, substituted by a hydrophilic alkene group. Crosslinking in this case is possibly only via biradical oxygen initiated by catalysts. This additive serves exclusively as thickener and agent modifying rheology; it promotes the crosslinking of latex paints.

Latex compositions comprising the additives serve for replacement of oil-based compositions and therefore the replacement of paints having a high VOC content. The content of cellulose ether additive in the latex matrix is 0.05 to 3.00% by weight. Latex polymers consist of differing, generally synthetic, macromolecules, generally based on acrylates and are commercially conventional. The crosslinkable additives are produced in the patent by reaction of monounsaturated to polyunsaturated aromatic and aliphatic glycidyl ether derivatives with cellulose ethers. The crosslinking reaction takes place here catalytically in the presence of $MnSO_4$ or $CoCl_2$ by addition reaction of a cyclic ether.

Patent DE 103 08 236 describes biodegradable agricultural liquid films based on polyhydroxypolyethers. These are produced with considerable complexity and use of toxic chemicals such as, for example, formic acid, hydrogen peroxide, phosphoric acid and sulfuric acid, by acid-catalytic chemical reactions at temperatures of 80-120° C., which is at the expense of the cost/benefit ratio. After atomization of the water/acetone solution or suspension, the film formation itself takes place in turn only via a pure mechanical pathway via adhesion of the soil particles. The field of application is therefore restricted to soil application, a film having inherent stability is not formed, as a result of which no further applications are possible. This is also opposed by the insufficiently controllable biodegradability. Furthermore, the application proceeds via atomization of water/acetone mixtures, which is unacceptable, for example, for use in the indoor sector.

DE 10 2005 053 587 describes the production of temporarily degradable films for agriculture, based on an alkali metal silicate solution or dispersion to which are admixed biodegradable native oligopolyols. The spraying solution is produced in a plurality of steps and is extremely complex from chemical and technological aspects (temperatures up to 200° C., use of a 50% strength potassium hydroxide solution, filtration processes). Despite the use of plasticizing components, the mechanical properties are only adjustable with restrictions. Silicates yield naturally brittle and hard moldings.

Finally, U.S. Pat. No. 2,329,741 describes the production of films from hydroxyalkylcelluloses by crosslinking reactions with bifunctional aldehydes. No cellulosic main component such as, e.g., wood pulp, recycled cellulose or sawdust, is used. Solely cellulose derivatives are crosslinked, whereby a completely different crosslinking structure results, which cannot cover a broad field of application. Furthermore, the costs with sole use of heteroglycan polysaccharide derivatives are markedly higher, in particular in the case of gellans and xanthans. The crosslinking takes place at a temperature of 105° C., which makes a practical wet processing virtually impossible.

WO 2008/112419 A2 relates to a storage-stable aqueous latex paint which contains titanium oxide, vinyl acrylic latex, acrylic latex and PVC. Cross linking via acetyl or ketal formation does not take place in this system. Spacer compounds are just as little mentioned in the abovementioned patent that are chemically incorporated into sprayed films and themselves already have biological and fire-retardant properties and moreover affect, the physical properties of the coating depending on the type of the polyol. Likewise, no chemical crosslinking would have to take place via the latex paint with the surface that is to be coated, but if it does, then it is in a considerably different manner than acetylization or ketalization.

The main components of this coating are water, polyvinyl chloride, acrylic latex, vinyl acrylic latex and TiO2, cellulose derivatives are only subordinate components.

SUMMARY OF ADVANTAGEOUS EMBODIMENTS OF THE INVENTION

The object of the present invention was therefore to find multifunctional films that can be applied in liquid form and are based on polysaccharide materials for consolidation and waterproofing, for covering and also for preserving surfaces such as, for example, soils, building claddings and wood structures in the roof region or at sites of elevated formation of condensate water, as occur, inter alia, in the region of rear-ventilated facades. A further object of the present invention was in this case to avoid the disadvantages of the technical solutions known in the prior art and to develop films that are inexpensive and usable under the typical application temperatures, are sufficiently mechanically stable, and have the necessary tightness and are equipped with additional functionalities. Used as an agricultural film, the microbiological parameters of the soil should not be adversely affected. In addition, via selection of the composition, it was necessary to be able to adapt moisture binding, mechanical parameters, biodegradability, pore sizes, etc., in accordance with the respective field of application within wide limits.

By reacting polysaccharide materials and/or water-soluble polysaccharide derivatives and polyol spacers with crosslinkers which have one or more carbonyl and/or carboxyl functions, mechanically stable and more or less flexible films may foe formed which retain the mechanical properties thereof up to an additional foreign material proportion of 80%.

DETAILED DESCRIPTION OF ADVNTAGEOUS EMBODIMENTS OF THE INVENTION

The polysaccharide, materials comprise not only homoglycan, but also heteroglycan, materials, water-insoluble recycled cellulose, e.g. milled waste paper, cellulose fibers or sawdust and water-soluble polysaccharide derivatives. Water-soluble polysaccharide derivatives are, in particular, cellulose derivatives and comprise, for example, methyl cellulose, carboxymethyl cellulose sodium, carboxymethyl cellulose in the acid form, hydroxyethyl cellulose. Starch derivatives are also included in the water-soluble polysaccharide derivatives, preferably hydroxyethyl starch. Heteroglycan materials are preferably xanthan, gellan and hyaluronic acid. Particularly suitable polysaccharide derivatives also include amino group-bearing polysaccharides such as aminocellulose and chitosan. Foreign matter can foe non-reactive organic or inorganic substances or functional additives.

The stable film layer is formed after acetalic or ketalic linking of the components with elimination of water at temperatures above 10° C. by the crosslinking of free aldehyde or keto groups of the multifunctional coating films with the functional groups of the surfaces that are to be coated, which effects an additional stabilization of the multifunctional coating films. The multifunctional layer is water- and UV-light-resistant. The polyols acting as spacers are preferably of natural origin and, via their functionality or their stearic configuration, influence the elasticity and swellability of the films. When tannic acid is used as polyol, the inflammability of the films is virtually completely suppressed. The films are permeable to water vapor, swellable in a controlled manner and can bind up to 75% water, based on the dry matter, corresponding to the degree of crosslinking and the spacer used.

According to the invention, dispersible, but water-insoluble solids, such, as, for example, polysaccharide materials and/or water-soluble polysaccharide derivatives are mixed with polyol spacers and crosslinkers in a one-pot synthesis. An initially storage-stable aqueous dispersion is formed which still remains water-soluble and reactive. After liquid application as a coating film to surfaces, curing proceeds via quantitative acetalic or ketalic crosslinking. In the case of use of CMC-Na in acid medium, curing proceeds via the formation of the acid form, as a result of which, surprisingly, an additional irreversible stabilization of the films is achieved after formation of the acid form.

The object of the polyol spacers is to ensure the elasticity of the resultant film and to affect the water uptake and vapor permeability. Suitable polyol spacers comprise, as aliphatic polyols, particularly ethylene glycol, propanetriol, triethylene glycol, polyethylene glycol and sorbitol, as cyclic polyols, in particular glucose, fructose and galactose, and as aromatic polyols, particularly cyanidin, corilagin, digallic acid, tannic acid and gallic acid.

Suitable water-soluble polysaccharide derivatives are water-soluble cellulose ethers, particularly preferably hydroxyalkyl celluloses, such as, for example, 2-HEC, carboxymethyl celluloses, methyl celluloses and hydroxyethyl starch, such as, for example, 2-HES. The particularly suitable polysaccharide derivatives also include amino group-bearing polysaccharides such as aminocellulose and chitosan.

The crosslinkers are selected from compounds which possess one or more carbonyl and/or carboxyl functions and are preferably dialdehyde components, diketo compounds or di-, tri- or tetracarboxylic acids. Particularly preferred dialdehyde components used are glyoxal, glutardialdehyde or terephthaldialdehyde. Particularly suitable keto components are acetone and acetylacetone. Via the selection of a suitable crosslinker and the degree of crosslinking, the adhesion to the surface that is to be coated and the degradability can be adjusted. The degradability depends upon the field of use of the films, e.g., for preservation and covering of building structures and wood, degradability is unwanted, but, on the contrary, very long service lives are wanted. For use in agriculture, in contrast, such degradability is desired, in order to be able to plough back the films after use, compost them, or dispose of them biologically in other ways.

In accordance with the coloring of the aromatic polyols used, water-insoluble, light-gray to black films having an inherent, stability are formed.

Via the reaction of polysaccharidic materials and/or polysaccharide derivatives with crosslinkers which possess one or more carbonyl and/or carboxyl functions, and polyol spacers, more or less flexible clear films are formed which retain the advantageous mechanical properties thereof up to a foreign matter content of 80%. Foreign components can be non-reactive, organic or inorganic substances and/or functional additives. A stable film layer having exactly adjustable service lives is formed at typical temperatures of use.

Particularly good adhesion is obtained by application of the film solution to porous surfaces, such as concrete, plaster or to surfaces which possess hydroxyl, carboxyl or amino groups, such as wood, glass, paper, plastics. Good adhesion is also achieved to metal surfaces.

At a degree of reaction of the polysaccharidic materials, the polysaccharide derivatives and polyol spacers with the crosslinkers which possess one or more carbonyl and/or carboxyl functions, for example a dialdehyde component, a mono- or diketo compound or a di-, tri- or tetracarboxylic acid, of less than 81%, free crosslinker functionalities are still present which crosslink, with the functional groups of the surface that is to be coated. As dialdehyde components, preferably glyoxal, glutardialdehyde or terephthaldialdehyde are used, and as keto compound, preferably acetone or acetylacetone is used.

The mechanically stable, moisture-absorbent and controllably swellable coating films on the surfaces, for example on a wood surface, are formed after acetalic or ketalic linking of the components with elimination of water at temperatures below 10° C. The layer is water and UV-light stable. The functioning period of the coating film can be adjusted.

All of the substances used for film formation are preferably of biological origin. The film layer is permeable to water vapor and swellable and can bind up to 75% water, based on the dry matter, corresponding to the adjusted degree of crosslinking and the spacer used.

The multifunctional films that can be applied in liquid form and are based on cellulose or starch are, after application, able to react with the surfaces that are to be coated, forming additional acetalic or ketalic bonds, and thereby form a long-lasting covalent bond. The resultant solid film forms an even structure, penetrates into all irregularities of the surfaces that are to be coated and swells and shrinks in accordance with the relative humidity, in a similar manner as the coated surfaces, in such a manner that this layer is not subject, as are conventional paints or plastics films, to crack formation, but can even bridge surface- or structurally-related cracks or gaps up to 6 mm in width.

The solution according to the invention describes multi-functional films that can be applied in liquid form for consolidation and waterproofing, for covering and also for preserving surfaces such as, for example, soils, building claddings and wood structures in the roof region or at sites of elevated formation of condensate water, as may be found, inter alia, in the region of rear-ventilated facades.

Via an application-specific selection of the composition of the multifunctional films, it is possible to form mechanically stable and more or less flexible films which retain the mechanical properties thereof up to an additional foreign matter content of 80%.

Foreign matter of the coating films according to the invention can be non-reactive organic or inorganic substances, such as, for example, soil substrate, loam, rocks, rock flours, pigments, plastics particles, or the like.

The polyols acting according to the invention as spacers are preferably of natural origin.

Degree of crosslinking, hydrogel properties, mechanical strength and surface adhesion can be adapted within broad limits via the amount of crosslinker used, the number of functional groups thereof, the type and amount of polyol spacer used, the type and amount of foreign matter and the functional groups of the surfaces that are to be coated.

When used as an agricultural film, the residence time in the soil, that is to say the time period of the degradation of the coating films according to the invention that can be applied in liquid form, may be adjusted in a controlled manner via the degree of reaction and the type of chemical crosslinking of the polysaccharide materials and/or the polysaccharide derivatives, and polyol spacers with the crosslinker. A long-term stability of the films is only achieved at an optimum degree of crosslinking [table 1].

TABLE 1

Breakdown of glyoxal-crosslinked hydroxyethyl cellulose in the soil

| | Degree of reaction [% by mass] | | | | | |
|---|---|---|---|---|---|---|
| | 0.2 | 0.25 | 0.3 | 0.5 | 0.7 | 1.0 |
| Degradation time*) [d] | 10 h | 14 h | 1 | 4 | 225 | 237 |
| | Degree of reaction [% by mass] | | | | | |
| | 1.2 | 1.5 | 2.0 | 4.0 | 7.5 | 12.5 |
| Degradation time*) [d] | 241 | 40 | 21 | 7 | 2 | 10 h |

*)Start of a crack formation

The table makes clear that, depending on the degree of reaction, the lifetime of the biological film can be adjusted. In this case, the lifetime passes through a maximum and decreases again at a higher degree of reaction. Other criteria for the adjustment of the lifetime, i.e. for the time point of degradability, are the type of crosslinker and the polysaccharide materials used.

The temperature fluctuations occurring particularly in the roof or cellar region and the associated formation of condensate water are prevented by the ability of the coating films according to the invention for hydrogel formation.

Furthermore, by the use of the vapor and heat barrier according to the invention that can be applied in liquid form, not only the working time in roof insulations may be optimized, but also the possibility also results in the case of remediations of old buildings of application of liquid film as a sealing layer at sites otherwise only achievable with considerable extra expenditure.

The coating films used, according to the invention can be used not only in new buildings but also in remediation of old buildings.

The polyols employed according to the invention are added to the polymer not as commercially known plasticizers, but participate as spacers directly in the crosslinking reaction. The bonding capacity to surfaces depends on the achieved degree of crosslinking of the film solution.

No change in the film properties takes place under the effect of natural UV light.

The coating film according to the invention is non-toxic and, when applied properly, does not give rise to any irritations of eyes, skin and mucosae.

In addition, the cured film is distinguished in that it meets the construction material fire class B2, the airtightness of the film, at a material usage of 1 l/m², can reach a value of 0.7-1.2 /h, and an sd value of 0.7-1.4 m is determined for the resistance to diffusion of the films. The extensibility of the film, without detachment from the wood surface, at a stress of 55 N/mm², is 60%. The solid film has good overpaintability and overworkability.

The films that can be applied according to the invention in liquid form adhere very well to wood, paper, glass, plaster, metal and plastics, such as, e.g., plastics films. The adhesion to surfaces made of materials which possess hydroxyl, carboxyl or amino groups is particularly good. With these functional groups, the films that can be applied in liquid form enter into irreversible curing reactions with elimination of water.

Very good adhesion of the cured film according to the invention is also achieved on porous, soiled or dusty surfaces. The cured coating is impact resistant and scratch resistant. For processing the still liquid or pasty coating films, all techniques known to these skilled in the art are suitable such as, for example, brushing, atomizing, spray-painting, trowel application or the like.

The films that can be applied in liquid form display a multifunctional action and, in accordance with the stoichiometric composition, in addition to the use as coating film, are likewise suitable as fungicide, herbicide, insecticide and acaricide, they are fire inhibiting and UV stable, act as additional component in stabilizing light structural walls and mud structures and can release or absorb room moisture owing to the swellability thereof.

Owing to the type of the materials used and the possibility of imparting functional properties, use in medical technology, but also for wound healing or as a wound covering, and in the cosmetics industry, is possible.

The examples hereinafter are intended to illustrate the invention. Percentages therein are to be taken to mean percentages by weight unless stated otherwise or is immediately clear from the context.

EXAMPLE 1

For synthesis of the coating films that can be applied in liquid form, a 0.1 to 1 molar, preferably 0.4 to 0.5 molar, solution of the cellulose derivative in water is produced, mixed with the same amount of recycled cellulose and acidified using concentrated acetic acid to a pH of 2 to 6, preferably 4 to 5, and admixed with 0.05 to 0.5 mol, preferably 0.1 to 0.3 mol, of glyoxal, based on a 40% strength solution, stirred for 10 min at a temperature of 20 to 50° C., preferably 20 to 30° C., and then 0.1 to 0.5 mol, preferably 0.2 to 0.4 mol of the polyol component is added, and the mixture is stirred for 3 hours at 20 to 50° C., preferably 30 to 40° C. The reaction mixtures thus produced are partially crosslinked, still water-soluble products having viscosities between 0.68 and 1.46 Pa s in a temperature gradient from 15 to 30° C. After dilution with water in the ratio 1:5, an atomizable solution is obtained which is suitable as vapor barrier for wood structures. The concentrated product is storable for at least two years without change in properties.

EXAMPLE 2

A 0.1 to 0.5 molar, preferably 0.3 to 0.4 molar, solution of the polyol component in water is adjusted to pH 3 to 6, preferably 4 to 5, using acetic acid and admixed with 0.1 to 0.5 mol, preferably 0.3 to 0.4 mol, of glyoxal, based on a 40% strength solution, stirred for 20 min at a temperature of 20 to 50° C., preferably 30 to 40° C., and admixed with a 0.1 to 1 molar, preferably 0.4 to 0.5 molar, aqueous solution of the cellulose derivative which had been mixed with the same amount of recycled cellulose, and the mixture is stirred for 4 hours at a temperature of 20 to 50° C., preferably 30 to 40° C. The reaction mixtures thus produced are partially crosslinked, still water-soluble products having viscosities between 0.72 and 1.32 Pa s in a temperature gradient from 15 to 30° C. After dilution with water in the ratio 1:6, an atomizable solution is obtained which is suitable as vapor barrier for wood structures. The concentrated product is storable for up to two years without, change in properties.

EXAMPLE 3

A 0.1 to 1 molar, preferably 0.4 to 0.6 molar, aqueous solution of the cellulose derivative is adjusted to pH 3 to 6, preferably pH 4 to 5, using acetic acid and admixed, with 0.5 to 1.5 mol, preferably 0.8 to 1.2 mol, of glyoxal, based on a 40% strength solution, and the mixture is stirred for 10 min at a temperature of 20 to 50° C., preferably 30 to 40° C. Subsequently, 0.1 to 0.6 mol, preferably 0.3 to 0.5 mol, of an aromatic polyol, preferably tannic acid, is added thereto and the mixture is stirred for a further 60 min at a temperature of 20 to 50° C., preferably 30 to 40° C. This partially crosslinked, still water-soluble product, in addition to the property of film formation, still has a herbicidal action against monocotyledonous and dicotyledonous plants.

EXAMPLE 4

For the synthesis, a 0.1 to 1 molar, preferably 0.4 to 0.5 molar, solution of the cellulose derivative in water is produced, acidified to a pH of 2 to 6, preferably 4 to 5, using concentrated acetic acid and admixed with 0.1 to 0.5 mol, preferably 0.2 to 0.3 mol, of glyoxal or glutardialdehyde, based on a 40% strength solution, the mixture is stirred for 10 min at a temperature of 20 to 50° C., preferably 20 to 30° C., to this solution, then 0.1 to 0.8 mol, preferably 0.3 to 0.6 mol, of an aromatic polyol, preferably tannic acid, is added, and the mixture is stirred for a further 60 min at a temperature of 20 to 50° C., preferably 30 to 40° C. The still water-soluble product, in addition to the property of film formation, still has a fungicidal action against. *Ceratocystis* sp. *Heterobasidium annosum, Disculapinicola, Fungi imperfecti*, and *Candida albicans*. [Table 2] [Determination as specified in DIN 58940-84, issue date: 2002-October Medical microbiology—sensitivity testing of microbial pathogens to chemotherapeutics—part 84: Microdilution; special requirements for testing fungi against antimycotics]

TABLE 2.1

Fungicidal action of HEC-Corilagin at a degree of substitution of 0.35

| HEC-Corilagin 10 μg | Ceratocystis sp. | Heterobasidion annosum | Discula pinicola | Fungi imperfecti | Candida albicans |
|---|---|---|---|---|---|
| Inhibition zone diameter [mm] | 21 | 27 | 22 | 18 | 26 |

TABLE 2.2

Fungicidal action of HEC-Cyanidin at a degree of substitution of 0.35

| HEC-Cyanidin 10 μg | Ceratocystis sp. | Heterobasidion annosum | Discula pinicola | Fungi imperfecti | Candida albicans |
|---|---|---|---|---|---|
| Inhibition zone diameter [mm] | 16 | 19 | 14 | 13 | 11 |

TABLE 2.3

Fungicidal action of HEC-Digallic at a degree of substitution of 0.35

| HEC-Digallic acid 10 μg | Ceratocystis sp. | Heterobasidion annosum | Discula pinicola | Fungi imperfecti | Candida albicans |
|---|---|---|---|---|---|
| Inhibition zone diameter [mm] | 18 | 27 | 29 | 16 | 13 |

TABLE 2.4

Fungicidal action of HEC-Corilagin at a degree of substitution of 0.7

| HEC-Corilagin 10 μg | Ceratocystis sp. | Heterobasidion annosum | Discula pinicola | Fungi imperfecti | Candida albicans |
|---|---|---|---|---|---|
| Inhibition zone diameter [mm] | 34 | 41 | 37 | 28 | 39 |

TABLE 2.5

Fungicidal action of HEC-Cyanidin at a degree of substitution of 0.7

| HEC-Cyanidin 10 μg | Ceratocystis sp. | Heterobasidion annosum | Discula pinicola | Fungi imperfecti | Candida albicans |
|---|---|---|---|---|---|
| Inhibition zone diameter [mm] | 22 | 31 | 21 | 19 | 14 |

TABLE 2.6

Fungicidal action of HEC-Digallic acid at a degree of substitution of 0.7

| HEC-Digallic acid 10 μg | Ceratocystis sp. | Heterobasidion annosum | Discula pinicola | Fungi imperfecti | Candida albicans |
|---|---|---|---|---|---|
| Inhibition zone diameter [mm] | 28 | 38 | 39 | 21 | 18 |

EXAMPLE 5

A 0.4 to 1.0 molar, preferably 0.6 to 0.8 molar, aqueous solution of the polysaccharide derivative is acidified to a pH of 2.5 to 6.5, preferably 4 to 5, using concentrated acetic acid, and is then admixed with acetone until the water-soluble polysaccharide derivative starts to precipitate out. The still clear solution is stirred for 1 hour at 35 to 55° C., preferably 50° C., and thereafter admixed with 0.4 to 0.9 mol, preferably 0.7 mol, of an aqueous solution of an aromatic polyol, preferably tannic acid, and stirred for a further 20 to 40 min, preferably 30 min, at this temperature. The still water-soluble product, after the complete removal of water from the reaction system, forms water-insoluble flexible films.

EXAMPLE 6

A 0.2 to 1.2 molar, preferably 0.8 to 1.0 molar, aqueous solution of the polysaccharide is acidified to a pH of 3 to 7, preferably 4 to 6, using concentrated acetic acid and is then admixed with acetylacetone until the water-soluble polysaccharide begins to precipitate out. The still clear solution is stirred for 2 to 6 hours, preferably 4 hours, at a temperature of 40 to 80° C., preferably 60° C., and thereafter admixed with a 0.8 to 1.2 molar, preferably 1 molar, aqueous solution of an aromatic polyol, preferably tannic acid, and stirred for a further 60 to 120 min, preferably 80 min, at this temperature. The still water-soluble product, after the complete removal of water from the reaction system, forms water-insoluble flexible films.

The invention claimed is:

1. Multifunctional coating films that can be applied in liquid form for consolidation and waterproofing, for covering and also for preserving surfaces, wherein said films comprise a composition of water-insoluble, polysaccharidic materials and/or homo- or heteroglycan water-soluble polysaccharide derivatives, polyol spacers and crosslinkers having at least one carbonyl or carboxyl function, wherein the crosslinkers are dialdehydes, ketones, diketones, di-, tri- or tetracarboxylic acids and the dialdehydes comprise glyoxal, glutardialdehyde or terephthaldialdehyde, the composition at the time of the application thereof is water soluble and reactive, after the curing thereof remains water absorbent or swellable, water vapor permeable, water stable and UV stable, is biodegradable and has incorporated functional additives, and the polysaccharidic materials and/or polysaccharide derivative and polyol spacers have been reacted with the crosslinkers to a degree that leaves free crosslinker functionalities which can crosslink with functional groups of the surfaces that are to be coated.

2. The multifunctional coating films that can be applied in liquid form as claimed in claim 1, wherein the polyol spacers are aliphatic, cyclic or aromatic polyols.

3. The multifunctional coating films that can be applied in liquid form as claimed in claim 2, wherein the polyol spacers are ethylene glycol, propanetriol, triethylene glycol, polyethylene glycol, sorbitol, glucose, fructose, galactose, cyanidin, corilagin, digallic acid, gallic acid or tannic acid.

4. The multifunctional coating films that can be applied in liquid form as claimed in claim 2, wherein the polyol spacer is tannic acid, and the resulting film exhibits herbicidal and fungicidal properties.

5. The multifunctional coating films that can be applied in liquid form as claimed in claim 1, wherein the crosslinkers are ketones.

6. The multifunctional coating films that can be applied in liquid form as claimed in claim 5, wherein the crosslinkers are acetone or acetylacetone.

7. The multifunctional coating films that can be applied in liquid form as claimed in claim 1, wherein the polysaccharidic materials are of natural or synthetic origin.

8. The multifunctional coating films that can be applied in liquid form as claimed in claim 7, wherein the polysaccharidic materials are recycled cellulose in the form of milled waste paper.

9. The multifunctional coating films that can be applied in liquid form as claimed in claim 1, wherein the water-soluble polysaccharide derivatives are cellulose ethers or starch derivatives.

10. The multifunctional coating films that can be applied in liquid form as claimed in claim 9, wherein the cellulose ethers are hydroxyalkyl celluloses, methyl celluloses or carboxymethyl celluloses and the starch derivative is hydroxyethyl starch.

11. The multifunctional coating films that can be applied in liquid form as claimed in claim 1, wherein the films are a swellable waterproofing layer, the film swellability is affected by the polyol spacer type and, as hydrogel, can bind up to 75% by weight water, based on dry matter thereof, corresponding to a degree of crosslinking, without losing its waterproofing layer property.

12. The multifunctional coating films that can be applied in liquid form as claimed in claim 1, wherein the films retain their mechanical properties up to a foreign matter content of 80% by weight.

13. The multifunctional coating films that can be applied in liquid form as claimed in claim 1, wherein a concentrated aqueous dispersion having a viscosity>2.0 Pa s is storable for at least two years without change in properties, the films comply with construction material class B2, the films have an airtightness, at a material usage of 1 l/m$^2$, that reaches a value of 0.7-1.2 /h, an so value of 0.7-1.4 m is measured for the resistance to diffusion of the films, and the films have an extensibility, without detachment from a surface, at a stress up to 55 N/mm$^2$, of between 30 and 60%.

14. The multifunctional coating films that can be applied in liquid form as claimed in claim 1, wherein the films in solid form have overpaintability or overworkability, and adhere to wood, paper, glass, plaster and metal.

15. The multifunctional coating films that can be applied in liquid form as claimed in claim 1, wherein said films are applied as a functional layer for consolidation and waterproofing, for covering and also for preserving surfaces.

16. The multifunctional coating films that can be applied in liquid form as claimed in claim 15, wherein the surfaces are building claddings and wood structures in the roof region or at sites of elevated formation of condensate water.

17. The multifunctional coating films that can be applied in liquid form as claimed in claim 1, wherein said films have herbicidal, fungicidal, insecticidal and acaricidal properties.

18. Soil stabilizer, soil covering and unwanted growth suppressant in the agricultural and gardening sectors comprising the multifunctional coating films that can be applied in liquid form as claimed in claim 1, wherein, and the film's residence time in the soil is adjustable depending on the crosslinker composition/degree of crosslinking and degree of substitution.

19. The multifunctional coating films as claimed in claim 1, wherein the degree of reaction is less than 81%.

20. A method for producing multifunctional coating films that can be applied in liquid form on the basis of polysaccharidic materials, comprising forming an aqueous dispersion by mixing dispersible polysaccharidic materials in solid form with polyol spacers and with crosslinkers which have one or more carbonyl and/or carboxyl functions, wherein the crosslinkers are dialdehydes, ketones, diketones, di-, tri- or tetracarboxylic acids and the dialdehydes comprise glyoxal, glutardialdehyde or terephthaldialdehyde and incorporating functional additives in a one-pot synthesis with water as solvent to form an initially storage-stable aqueous dispersion, wherein the polysaccharidic materials and/or polysaccharide derivatives and polyol spacers have reacted with the crosslinkers to a degree that leaves free crosslinker functionalities which can crosslink with functional groups of the surface that are to be coated, applying the dispersion as a liquid coating film to surfaces in an acid medium, and crosslinking quantitatively via acetals or ketals, wherein all chemical reactions proceed in the solvent water and the crosslinking takes place at temperatures from 10° C.

21. A method as claimed in claim 20 for producing coating films that can be applied in liquid form on the basis of polysaccharide materials, wherein the polysaccharide materials are cellulosic materials and/or water-soluble polysaccharide derivatives.

22. A method as claimed in claim 21 for producing coating films that can be applied in liquid form on the basis of polysaccharide materials, wherein the water-soluble polysaccharide derivatives are hydroxyethyl celluloses, methyl celluloses, carboxymethyl celluloses and hydroxyethyl starches.

* * * * *